United States Patent
Ganapathy et al.

(10) Patent No.: US 11,082,258 B1
(45) Date of Patent: Aug. 3, 2021

(54) ISOLATION AND SEGMENTATION IN MULTI-CLOUD INTERCONNECTS

(71) Applicant: Cisco Technology, Inc., San Jose, CA (US)

(72) Inventors: Sivakumar Ganapathy, Fremont, CA (US); Rajagopalan Janakiraman, Cupertino, CA (US); Suresh Pasupula, Cupertino, CA (US); Sachin Gupta, Santa Clara, CA (US); Shashank Chaturvedi, San Jose, CA (US); Prashanth Matety, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 16/742,604

(22) Filed: Jan. 14, 2020

(51) Int. Cl.
*G06F 15/177* (2006.01)
*H04L 12/46* (2006.01)
*H04L 12/741* (2013.01)
*H04L 29/06* (2006.01)

(52) U.S. Cl.
CPC .......... *H04L 12/4641* (2013.01); *H04L 45/54* (2013.01); *H04L 65/1066* (2013.01)

(58) Field of Classification Search
CPC . H04L 12/4641; H04L 65/1066; H04L 45/54; H04L 45/00; H04L 12/28
See application file for complete search history.

(56) References Cited

U.S. PATENT DOCUMENTS 10,959,098 B2 * 3/2021 Cidon ................. H04L 12/4633
2020/0235990 A1 * 7/2020 Janakiraman ....... H04L 41/0816

OTHER PUBLICATIONS

Microsoft, "Configure a Site-to-Site VPN over Express route Microsoft Peering," Microsoft, Published Feb. 25, 2019 (Year: 2019 ).*

* cited by examiner

*Primary Examiner* — Lan-Huong Truong
(74) *Attorney, Agent, or Firm* — Lee & Hayes, P.C.

(57) ABSTRACT

Techniques for maintaining isolation and segregation for network paths through multi-cloud fabrics using VRF technologies. The techniques include running virtual routers in a cloud network that connect the cloud network to an on-premises network using a network overlay that preserves VRF information in data packets. Further, the virtual routers connect to individual gateways in the cloud network using tunnels, and each individual gateway is connected to multiple VPCs without overlapping subnets. The virtual routers may assign a sink VRF to each gateway connection that can be used to perform source-IP based VRF selection by mapping source IP addresses in each tunnel connection to appropriate VRFs for the source IP addresses. In this way, virtual routers may use sink VRFs to translate into the VRF information for data packets from the VPCs via source-IP based lookup, and use the corresponding VRF route table to determine next hops for data packets.

20 Claims, 9 Drawing Sheets

ISOLATION AND SEGMENTATION IN MULTI-CLOUD INTERCONNECTS

TECHNICAL FIELD

The present disclosure relates generally to maintaining isolation and segregation for network paths through multi-cloud fabrics that utilize virtual routing and forwarding (VRF) technologies.

BACKGROUND

With the continued increase in the proliferation and use of devices with Internet accessibility, the demand for Internet services and content has similarly continued to increase. The providers of the Internet services and content continue to scale the computing resources required to service the growing number of user requests without falling short of user-performance expectations. For instance, providers typically utilize large and complex datacenters to manage the network and content demands from users. The datacenters generally comprise server farms that host workloads that support the services and content, and further include network devices such as switches and routers to route traffic through the datacenters and enforce security policies.

Generally, these networks of datacenters can come in two flavors, private networks owned by entities such as enterprises or organizations (e.g., on-premises networks), and public cloud networks owned by cloud providers that offer compute resources for purchase by users. Often, enterprises will own, maintain, and operate on-premises networks of compute resources to provide Internet services and/or content for users or customers. However, as noted above, it can become difficult to satisfy the increasing demands for computing resources while maintaining acceptable performance for users. Accordingly, private entities often purchase or otherwise subscribe for use of compute resources and services from public cloud providers. For example, cloud providers can create virtual private clouds (also referred to herein as "private virtual networks") on the public cloud and connect the virtual private cloud or network to the on-premises network in order to grow the available compute resources and capabilities of the enterprise. Thus, enterprises can interconnect their private or on-premises network of datacenters with a remote, cloud-based datacenter hosted on a public cloud, and thereby extend their private network.

However, because on-premises networks and public cloud networks are generally developed and maintained by different entities, there is a lack of uniformity in the policy management and configuration parameters between the datacenters in the on-premises networks and public cloud networks. This lack of uniformity can significantly limit an enterprise's ability to integrate their on-premises networks with public cloud networks by, for example, being unable to apply consistent policies, configuration parameters, routing models, and so forth. Various entities have developed software-defined network (SDN) and datacenter management solutions that translate the intents of enterprise or organizations from their on-premises networks into their virtual private cloud networks for applications or services that are deployed across multi-cloud fabrics or environments. Accordingly, these multi-cloud SDN solutions must continually adapt for changes occurring within the on-premises networks and public cloud networks, while maintaining the business and user intents of the enterprises or organizations that supplement their on-premises networks with computing resources from the public cloud networks.

For example, enterprises that manage on-premises networks of datacenters often isolate and segment their on-premises networks to improve scalability, resiliency, and security in their on-premises networks. To satisfy the entities' desire for isolation and segmentation, the endpoints in the on-premises networks can be grouped into endpoint groupings (EPGs) using, for example, isolated virtual networks that can be used to containerize the endpoints to allow for applying individualized routing models, policy models, etc., across the endpoints in the EPGs. Generally, each subnet in an EPG or other virtual grouping of endpoints is associated with a range of addresses that can be defined in routing tables used to control the routing for the subnet. Due to the large number of routing tables implemented to route traffic through the on-premises networks, the entities managing the on-premises networks utilize virtual routing and forwarding (VRF) technology such that multiple instances of a VRF routing table are able to exist in a router and work simultaneously. Accordingly, subnets of EPGs in the on-premises networks of entities are associated with respective VRF routing tables and routers are able to store and utilize multiple instances of VRF routing tables simultaneously.

While SDN solutions may implement VRF segregation for traffic in the on-premises networks, various issues may arise when maintaining the VRF segregation for all traffic going between the public cloud network and the on-premises network. Generally, public cloud networks may include multiple regions, sites, or other areas where a VRF may be mapped into one VPC per region. Across the VRFs in the public cloud network, subnets can overlap in various examples, such as subnets overlapping between different VPCs in a same region, or across different regions if the VPCs belong to different VRFs. Overlapping subnets across VPCs and regions is often necessary for a multi-cloud fabric solution due to the VRFs needing to remain the same between on-premises datacenters and cloud datacenters such that the workloads can extend between the two domains seamlessly and carry overlapping Internet Protocol (IP) addresses with end-to-end segmentation and isolation.

To interconnect an on-premises datacenter with a cloud datacenter, SDN solutions may utilize gateways or routers that are provided by the provider of the public cloud networks. While the use of these gateways provided by the public cloud networks may be advantageous in some respects, such as behaving as a distributed router catering to multiple virtual private clouds (VPCs) of the subscribing enterprise or organization, these gateways may also present some issues when interconnecting the on-premises datacenters with the cloud datacenters.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
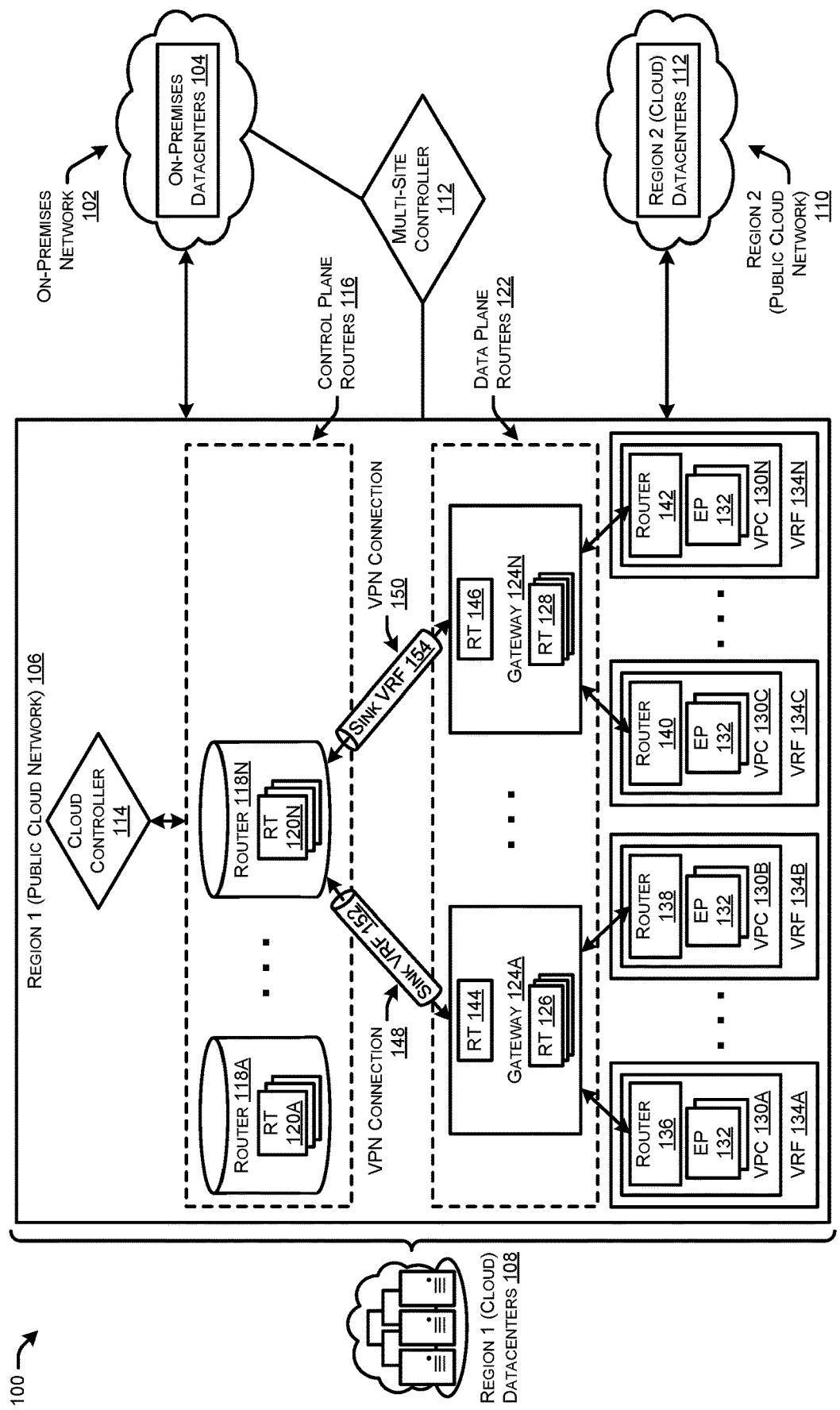
FIGS. 1A-1C illustrate a system diagram of an example architecture for maintaining isolation and segregation for network paths through multi-cloud fabrics that utilize VRF technologies.

The disclosure describes a method of maintaining isolation and segregation for network paths through network devices that utilize virtual routing and forwarding (VRF) technologies. The method may include assigning a first data plane router to first data plane traffic associated with first endpoints included in a first private virtual network of a cloud-based network. The first private virtual network may be associated with a first address space for the first endpoints that is associated with a first virtual routing and forwarding (VRF) routing table stored in the first data plane router, and the cloud-based network may be included in a multi-cloud fabric that further includes an on-premises network of on-premises endpoints. Further, the method may include assigning the first data plane router to second data plane traffic associated with second endpoints included in a second private virtual network of the cloud-based network. The second private virtual network may be associated with a second address space for the second endpoints that is associated with a second VRF routing table stored in the first data plane router. In some examples, the data plane routers may each be associated with multiple virtual private networks having respective address spaces. The method may additionally include causing the first data plane router and a control plane router in the cloud-based network to establish a first virtual private network (VPN) connection. In some instances, the control plane router may already have established a second VPN connection with a second data plane router and a third VPN connection with the on-premises network. The method may include storing, at the control plane router, mapping data indicating associations between VPN connections, source addresses for endpoints, and VRF routing tables.

Additionally, the method may include receiving, at the control plane router, from the first data plane router, a data packet over the first VPN connection where the data packet originating from a particular first endpoint of the first endpoints. The method may further include determining, at the control plane router and using the mapping data, that the first VPN connection and a particular source address of the data packet are associated with the first VRF routing table. Even further, the method may include determining, at the control plane router and using the first VRF routing table stored at the control plane router, a next hop for the data packet.

In some instances, rather than the data packet being received from an endpoint in the cloud-based network and sent to the one-premises network, the techniques may be similarly applied when a data packet is received from the on-premises network and sent to an endpoint device in the cloud-based network Additionally, the techniques described herein may be performed by a system and/or device having non-transitory computer-readable media storing computer-executable instructions that, when executed by one or more processors, performs the method described above.

EXAMPLE EMBODIMENTS

As noted above, enterprises and other organizations may own, maintain, and operate on-premises networks of compute resources for users or customers, and also for supporting internal compute requirements for running their organizations. However, due to the difficulties in satisfying the increasing demands for computing resources while maintaining acceptable performance for users, these enterprises may otherwise subscribe for use of compute resources and services from public cloud providers. For example, cloud providers can create virtual private clouds (also referred to herein as "private virtual networks") on the public cloud and connect the virtual private cloud or network to the on-premises network in order to grow the available compute resources and capabilities of the enterprise. Thus, enterprises can interconnect their private or on-premises network of datacenters with a remote, cloud-based datacenter hosted on a public cloud, and thereby extend their private network.

However, the lack of uniformity between on-premises networks and public cloud networks across various dimensions, such as policy management, configuration parameters, etc., may significantly limit an enterprise's ability to integrate their on-premises networks with public cloud networks by, for example, being unable to apply consistent policies, configuration parameters, routing models, and so forth. Various SDN solutions have been developed to translate the intents of enterprise or organizations from their on-premises networks into their virtual private cloud networks for applications or services that are deployed across multi-cloud fabrics or environments. For example, Cisco's software-defined network and datacenter management solution, the Application-Centric Infrastructure (ACI), provides a comprehensive solution for automated network connectivity, consistent policy management, and simplified operations for multi-cloud environments. The Cisco Cloud ACI solution allows enterprises to extend their on-premises networks into various public clouds, such as Amazon Web Services (AWS), Google Cloud, Microsoft Azure, and so forth. The Cisco Cloud ACI solution provides an architectural approach for interconnecting and managing multiple regions and/or sites, such as by defining inter-cloud policies, providing a scalable architecture with full fault-domain isolation and change-domain isolation, and ensuring that issues cannot cascade and bring down the entire distributed environment.

Various difficulties arise for SDN solutions such as Cisco Cloud ACI when attempting to interconnect on-premises networks of datacenters with public cloud networks of datacenters. For example, cloud providers may impose different restrictions on networking configurations and policies, routing and policy models, and/or other restrictions for their public clouds. These restrictions may be different than the restrictions or permissions implemented by enterprises who have developed their on-premises networks of datacenters. However, to interconnect on-premises networks with public cloud networks, SDN solutions in the multi-cloud fabric space often have to reconcile those differences to seamlessly scale the on-premises networks across the public cloud networks.

As an example, VPCs in a public cloud network generally need to connect to routers in order to route traffic between the endpoints in the VPCs of the public cloud network and endpoints or other devices in the on-premises network. SDN solutions attempt to automate this connectivity between the on-premises networks and public cloud networks, such as by using solutions offered by providers of the public cloud networks. As an example, AWS provides a Transit Gateway (TGW) for use in automating this connectivity. Generally, the TGW, or just gateway, comprises a distributed router that connects to multiple VPCs. Rather than establishing VPN connections from each VPC to the router, the gateway is able to connect multiple VPCs to a single gateway, and also their on-premises networks to the single gateway. Attaching VPNs to each VPC is a cumbersome and costly task, and the transit gateway provides a single connection from on-premises networks to reach multiple VPCs in the AWS public cloud with relatively high bandwidth compared to VPN connections While these gateways are advantageous for various reasons, the different restrictions imposed for using these gateways surface issues for SDN controllers to solve when automating interconnectivity across a multi-cloud fabric. As an example, the gateways may require that each VPC connected to a particular gateway do not have overlapping subnets. Stated otherwise, all of the VPCs connected to a given gateway may be required to have unique address spaces or ranges (e.g., CIDR blocks) that do not overlap. However, enterprises that manage on-premises networks often define address ranges, such as VRFs, that have overlapping address spaces (e.g., overlapping prefixes). In fact, that is one of the advantages of VRFs is to allow for overlapping subnets while providing segmentation and isolation for network paths. Further, SDN solutions may employ routers that use tunnels to connect to the on-premises networks with overlays (VxLAN) that preserve the VRF information in packets in the multi-cloud fabric. However, the gateway provided by public cloud networks, such as AWS, may not support the overlay function to preserve the VRF information in data packets.

This disclosure describes techniques for maintaining isolation and segregation for network paths through multi-cloud fabrics using virtual routing and forwarding (VRF) technologies. Initially, the techniques include spinning up gateways as needed to ensure that VPCs with overlapping subnets are spread across the gateways to satisfy restrictions imposed on gateways of public cloud networks. Further, the techniques include running virtual routers (e.g., Cisco Cloud Services Router (CSR) 1000v series routers) in infra VPCs of the public cloud network that connect the public cloud network to the on-premises network with a network overlay (e.g., VxLAN) that preserves the VRF information in data packets and extends VRF segregation across the multi-cloud interconnect. To provide connectivity from these virtual routers to the VPCs of endpoints, the techniques include connecting multiple VPCs, without overlapping subnets, to individual gateways which are in turn connected to the virtual routers. To account for the gateways not supporting overlay functions for preserving VRF information in data packets, the techniques further include the use of a sink VRF per gateway connection to the virtual routers. The sink VRF assigned for each gateway connection can be used by the virtual router to perform source-IP based VRF selection for the incoming tunnel interfaces to map source IP addresses and gateway tunnel interfaces to appropriate VRFs for the source IP addresses. In this way, the sink VRF may be utilized to pass or map the VRFs for data packets from the VPCs to the virtual router. The virtual router may perform the source-IP based lookup and translate that source IP of the data packet into the appropriate VRF, perform the lookup on the corresponding VRF route table, and determine a next hop for the data packet.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
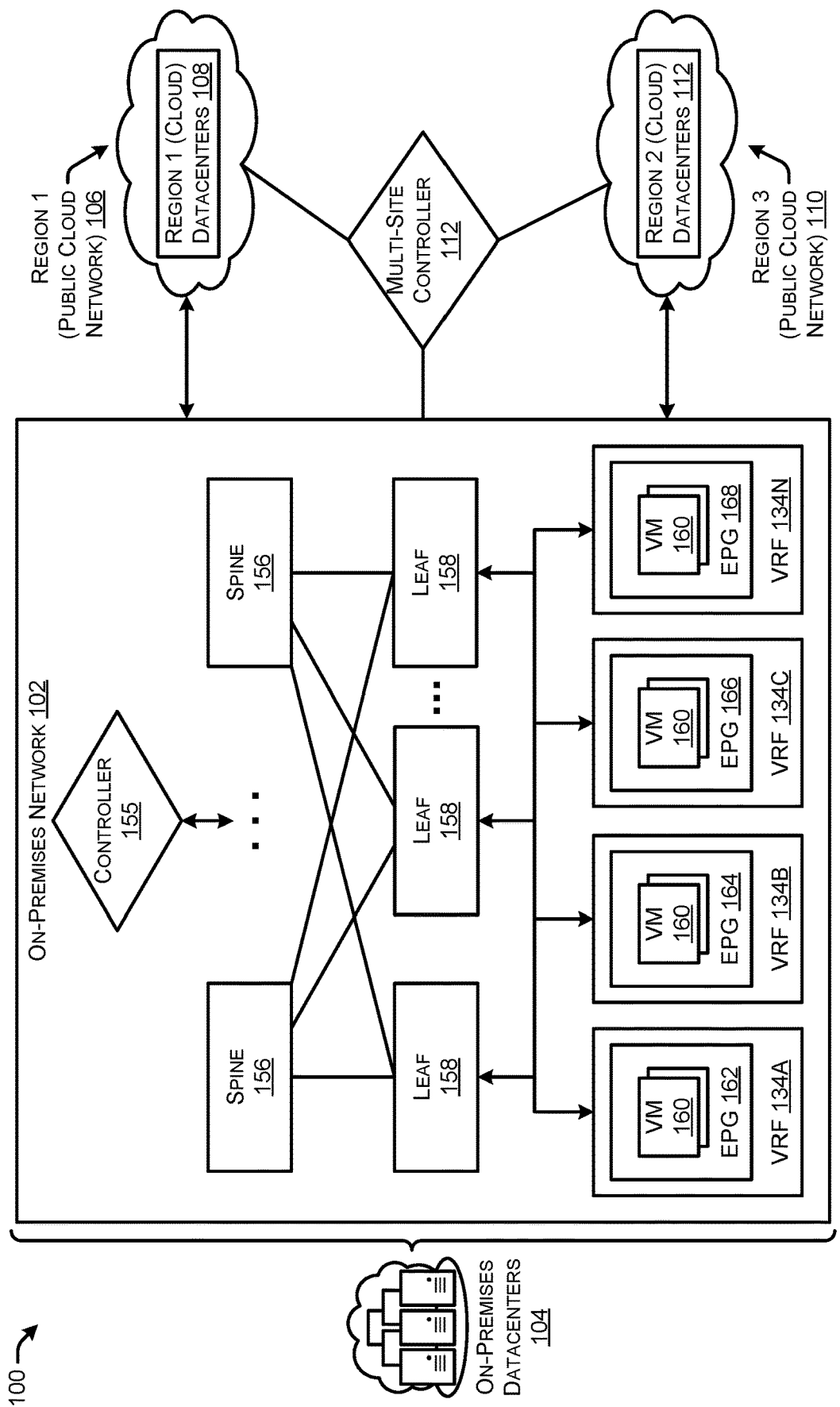
Figure 1C:
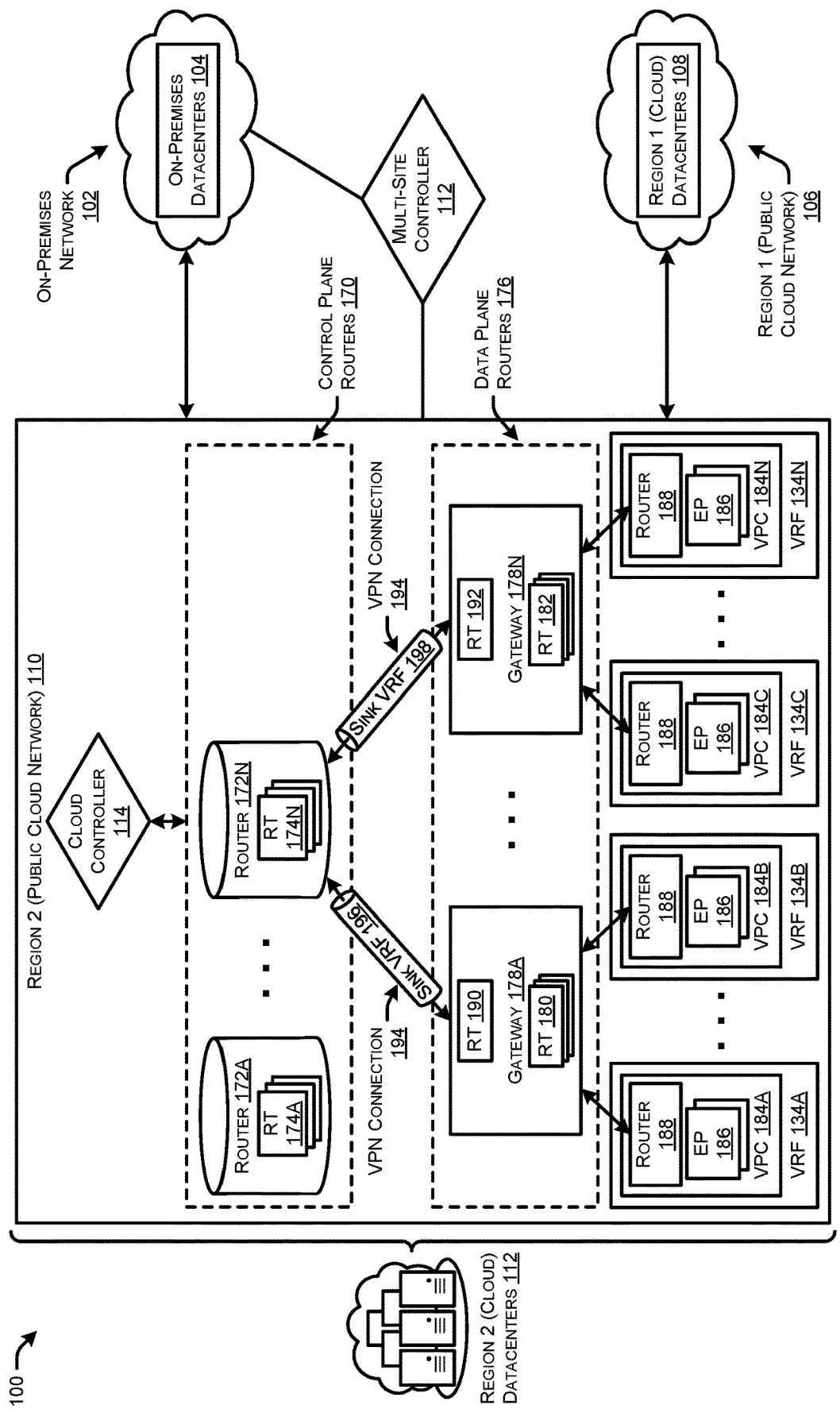

FIGS. 1A-1C illustrate a system diagram of an example architecture for maintaining isolation and segregation for network paths through a multi-cloud fabric 100 that utilizes VRF technologies. In this example, the multi-cloud fabric 100 may include an on-premises network 102 comprised of one or more on-premises datacenters 104, public cloud networks 106 and 110 comprised of one or more cloud datacenters 108 and 112 (e.g., region 1 and region 2, respectively). The datacenters 104, 108, and 112 may comprise any type of datacenter housing endpoints (e.g., servers) for supporting workloads, virtual machines, containers, etc., as well as networking devices (e.g., switches, routers, gateways, etc.) for facilitating the communication of traffic in the networks 102, 106, and 110 according to specified routing models, security policies, and so forth.

In this example, the on-premises network 102 may implement a specific SDN or datacenter solution, such as Cisco's ACI, while the public clouds 108 and 110 may implement different cloud solutions, such as Amazon's AWS, Microsoft's Azure, Google Cloud, and so forth. Generally, the security policies and network configurations of the networks 102, 106, and 110 can be managed by one or more controllers associated with the respective cloud provider, and/or an SDN controller for the multi-cloud solution, such as an ACI Application Policy Infrastructure Controller (APIC) and/or a multi-site APIC. APIC, and/or another SDN controller, is generally used to manage a site regardless of whether the site is on-premise 102 or a cloud network 106 and/or 110. The networking configurations and policies in public cloud networks 106 and 110 can have various routing and policy models or schemes, and different restrictions imposed by the cloud providers. For example, a cloud provider may impose restrictions which limit the number of security policies supported by an associated public cloud much below the scale of policies supported by the datacenter solution implemented at the on-premises datacenter 104. Accordingly, when Cisco's ACI solution is integrated with a public cloud solution, such as Amazon's AWS, the public cloud's restrictions can impose unnecessary restrictions on the ACI solution and create inconsistent policy models.

Accordingly, the multi-cloud fabric 100 can also include a multi-site controller 112 (e.g., multi-site APIC) which communicates with controller 114 in the public cloud network 106 (e.g., cloud APIC), as well as controllers in the on-premises network 102 and the public cloud network 110. The multi-site controller 112 may work with the controllers to manage and implement policies and configurations on both the on-premises network 102 and the public cloud networks 106 and 110. The multi-site controller 112 can implement, such as by translating, a same policy model in the on-premises network 102 and the public cloud networks 106 and 110, which can be based on a particular SDN or datacenter solution such as Cisco's ACI. For example, the multi-site controller 112 can implement VRFs, EPGs and associated policies in the on-premises network 102 as well as the public cloud networks 106 and 110. Such policies can be coordinated by the multi-site controller 112 with a controller in the on-premises network 102 and the cloud controllers in the public cloud networks 106 and 110, such as cloud controller 114 in the cloud network 106.

As illustrated, the public cloud network 106 may include virtual private clouds (VPCs) 130A, 130B, 130C, and 130N, which represent private networks on the public cloud network 106 and which can be interconnected with the on-premises network 102 and the public cloud network 110 as described herein. The VPCs 130 can host applications and resources on the public cloud network 106 for use by the on-premises network 102. Generally, individual ones of the VPCs 130 in a given region represents exactly one of the VRFs (e.g., 134A, 134B, 134C, 134N), and each of those VRFs 134 may each map to respective VRFs on the on-premises network 102 as described in FIG. 1B.

The VPCs 134A, 134B, 134C, and 134N can include endpoints (EPs) 132 on the public cloud network 106. For example, VPC 130A can include EPs 132, VPC 134B can include EPs 132, and VPC 134N can include EPs 132. The EPs 132 can include virtual/logical and/or physical endpoints, such as VMs, software containers, physical servers, etc. The EPs 132 can be included in security groups, which are policy constructs implemented by the public cloud 104, and which can be translated to EPGs as described herein. The security can include one or more respective security policies defined for traffic matching one or more attributes associated with the security groups, such as IP addresses (e.g., the IP addresses of EPs 132 in the security groups), labels (e.g., VM labels or tags), EP attributes (e.g., VM names or characteristics), IP prefixes, etc.

Traffic to and from the VPCs 134A, 134B, 134C, and 134N can be routed via routers 136, 138, 140, and 142, which can include virtual cloud routers included in the public cloud network 106, and the like. The routers 136, 138, 140, and 142 can serve as the ingress and egress points of the VPCs 134A, 134B, 134C, and 134N, and can interconnect the VPCs 134A, 134B, 134C, and 134N with each other as well as other external devices or networks (e.g., on-premises network 102 and public cloud network 110) through a cluster 122 of data plane routers 124A-124N.

As noted above, public cloud networks 106 and/or 110 may provide services to users that subscribe for use of their computing resources. As a specific example, AWS may provide the Transit Gateway (TGW) which is a network transit hub, such as a centralized virtual router running on virtual machines, containers, bare-metal, etc. The TGW may act as a hub that interconnects multiple VPCs 130 and controls how traffic is routed for the VPCs 130. Rather than attaching the VPCs 130 to the on-premises network 102 and/or public cloud network 110 using individual VPNs for each VPC 130, the TGW may allow for a single connection from the central gateway to connect on behalf of multiple VPCs 130. Accordingly, the gateways 124A-124N may comprise a TGW, or similar gateway, that is able to connect to multiple VPCs in a hub-and-spoke model to simplify management and reduce operational cost as the on-premises network 102 and public cloud network 110 need only connect to the gateway 124 as opposed to each individual VPC via an VPN. As shown, the gateways 124A and 124N may store route tables 126 and 128, respectively, that list routes to particular network destinations for particular source addresses. The routing tables 126 and 128 may comprise any type of routing tables, such as VRF route tables, that indicates routes to destination addresses, next hops for data packets, and/or any other information known to be included in routing tables in the art.

However, as noted above the TGW may have various restrictions imposed on it, such as not allowing for overlapping subnets in the VPCs 130 and not supporting various network overlays (e.g., VxLAN). This may introduce various difficulties, such as losing the VRF information from data packets transmitted from endpoints 132 in a VPC 132 and difficulties mapping VRFs from the on-premises network 102 that have overlapping subnets public cloud network 106 and behind the gateways 124.

Accordingly, in order to send and receive VRF information for data packets communicated via the interconnect of the multi-cloud fabric 100, the public cloud network 106 (and 110) may include one or more routers 118A-118N configured to communicate with the on-premises network 102 and public cloud network 110 using a network overlay that conveys VRF information. For instance, the routers 118 may comprise hardware routers, and/or virtual routers including cloud services routers (CSR), such as Cisco CSR1kV routers, that encapsulate the data packets using VxLAN, or other usable network overlays on Ethernet VPNs (EVPN) (e.g., an EVPN-VXLAN architecture), to carry VRF information in the packet headers for the data packets. In this way, the routers 118 may send and receive data packets including VRF information to and from the on-premises network 102, public cloud network 110, and so forth.

However, as noted above the gateways 124 may not support network overlays (e.g., TGWs) such that VRF information is lost for data packets that pass through the gateways 124. In this way, the routers 118 are unable to determine where to forward the data packets to using the stored routing tables 120.

According to the techniques described herein, the routers 118 may be configured to establish connections with the gateways 124 and communicate such that VRF information is translated for data packets that flow to and from the VPCs 130 and through the gateways 124. In some examples, the routers 118 establish VPN tunnels (e.g., IPSec VPN) with the gateways 124 to communicate data packets back and forth. The routers 118 and gateways 124 may communicate using various standards, such as a Border Gateway Protocol (BGP) configured to carry or use ranges of Internet Protocol (IP) address families (e.g., IPv6, IPv4, etc.). However, the gateways 124 may not support overlay functions, such as VxLAN, to preserve VRF information in the data packets. Thus, although each gateway 146 can have multiple VPCs 130 associated with it, there is only one IPv4/BGP session between the gateway 124 and router 118. Accordingly, any addresses (e.g., CIDRs) of the VPCs 130 in a gateway 124 will be advertise via the same VPC connection/tunnel 148 using the same IPv4/BGP session. In light of this, the router 118 will be unable to determine from which VPC 130 a data packet comes from when leaving the gateway 124, and further be unable to send data packets to the appropriate VPC 130 behind the gateways 124.

Accordingly, each router 118 may put each connected gateway on a "sink" VRF which aggregates all of the gateways 124 connected to the router 118 based on the connections. Each of the gateways 124 will be on one sink VRF. As illustrated, the gateway 124A will be on a sink VRF 152 and gateway 124N will be on a sink VRF 154. Thus, each gateway 124 sink VRF will carry routes from across multiple connected VPCs 130 (and thus multiple VRFs 134), and these routes need to be multiplexed and demultiplexed over the VPN connections 148/150 such that the VRFs of the VPCs 130 are honored. More specifically, all VRF routes in the router 118 going to a given gateway 124 need to be multiplexed into the appropriate "sink" VRF 152/154, and all the VRF routes that come in from a given gateway 124 on a "sink" VRF need to be demultiplexed into the corresponding router 118 VRF. Further, the multi-fabric network 110, specifically the public cloud networks 106 and 110, need to carry the notion of VRF segregation and route-leaking.

In order to achieve this, one or more gateways 124 may be deployed per site or region, and each of the gateways 124 is generally capable of supporting some threshold number of route tables (e.g., 20 route tables, 30 route tables, etc.). Each VPC 130 may be attached to at least one route table 126 associated with the gateway 124. Additionally, the gateway 124 needs to associate at least one route table 144 to the VPN connection 148 going infra the router 118. There will be one VPN connection 148/150 per gateway 124, for every router 118, and all the VPN connections 148/150 (or any other number of VPN connections) will be associated to the route tables 144/146 in the corresponding gateway 124. These VPN connections 148/150 (or tunnels) will exchange address information, such as CIDR prefixes, for all of the associated VPCs 134 via IPv4/BGP sessions to the routers 118.

In order to continue with VRF segregation, the routers 118 infra VPC will use source-IP based VRF selection in the incoming tunnel interface for the VPC connection 148/150 in the router 118. The incoming interface at the router 118 may comprise a tunnel interface running from the gateway 124. Because each gateway 124 represents a sink VRF, the corresponding router 118 tunnel interface belongs to the sink VRF. The route table 120 (or route map) used for source-IP based VRF selection is specific to one sink VRF, and when a data packet is received with a particular source IP address from a particular gateway 124A, the source IP address can be used to determine, for that connection 148, to which VRF the source IP address is mapped. Further, if that same source IP address is received from a different gateway 124 across the VPN connection 150, the source IP address may be mapped to a different VRF due to the data packet coming across the other VPN connection 150 associated with a different sink VRF.

Once the source IP address of the data packet is matched to the appropriate VRF, the router 118 may perform the route-lookup for the destination of the data packet using the appropriate VRF and forward the data packet in that VRF. Additionally, once the cloud routes are leaked into the correct VRF, they will then be advertised from the routers 118 via BGP/EVPN into remote regions, such as the on-premises network 102 and the public cloud network 110. Similarly, the routes received from other regions, such as the on-premises network 102 and the public cloud network 110, over the EVPN will be automatically inserted into the appropriate RTs in the local routers 118 (e.g., in the route tables 120). Thus, the routes received from the on-premises network 102 and the public cloud network 110, or other remote regions, will eventually be advertised via VPN connections 148 or tunnels to all gateways 124 in the same region or across different regions of the public cloud network(s).

Generally, the routers 118A-118N can provide interconnectivity between the public cloud network 106, the on-premises network 102, and the public cloud network 110 through a cluster 116 of control plane routers 118. The control plane routers 118 can manage the importing and exporting of routes into the on-premises network 102, the public cloud network 110, etc., in order to support interconnectivity between the public cloud network 106, the on-premises network 102, and the public cloud network 110. In some implementations, the control plane routers 118 can import and export routes using EVPN (Ethernet Virtual Private Network) BGP (border gateway protocol). The control plane routers 118 can establish BGP sessions with the public cloud network 110 and/or the on-premises network 102 to exchange routes.

The control plane routers 118 can include BGP speakers or agents for establishing BGP sessions. In some implementations, the control plane routers 118 support or implement two control plane sessions (e.g., BGP sessions) with every other region (e.g., on-premises network 102 and public cloud network 110) for redundancy and inter-region connectivity. In other implementations, the control plane routers 118 may support or implement more or less control plane sessions for every other region. For example, the control plane routers 118 may support or implement a single control plane session for one or more other network (e.g., on-premises network 102 and/or public cloud network 110) or more than two control plane session for one or more other regions (e.g., on-premises network 102 and/or public cloud network 110).

The control plane routers 118 can include CSR routers, such as Cisco CSR1kV routers, and can be equipped with sufficient capacity to store and manage all the routes for the public cloud 104. Moreover, the control plane routers 118 can support or implement internal control plane sessions (e.g., BGP sessions) with a cluster 122 of data plane routers or gateways 124, to exchange and manage routing information for the public cloud network 106.

FIG. 1B illustrates a system diagram of an example architecture of the on-premises network 102 in the multi-cloud fabric 100. The on-premises network 102 can be configured according to the specific SDN or datacenter solution implemented by the on-premises network 102, such as Cisco's ACI, which can be implemented and/or managed via one or more controllers, such as controller 155 (e.g., APIC). The controller 155 can manage security policies and interconnectivity for elements in the on-premises network 102, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises network 102. For example, the on-premises network 102 can include spine switches 156 and leaf switches 158 configured to provide network connectivity to VMs 160 in the on-premises network 102. In this example, the controller 155 can manage security policies and interconnectivity for traffic processed by the spine switches 156, the leaf switches 158, and the VMs 160.

The controller 155 can configure EPGs 162, 164, 166, and 168, which can be used to manage and implement policies and configurations for groups of endpoints (e.g., VMs 160). EPGs (e.g., 162, 164, 166, and 168) are managed objects that contain endpoints (e.g., VMs, software containers, virtual appliances, servers, applications, service chains, workloads, etc.) that are connected to the network (e.g., on-premises network 102) either directly or indirectly. Each EPG (162, 164, 166, and 168) can include a group of endpoints. For example, EPG 162, 164, 166, and 168 can include VMs 160.

The endpoints (e.g., VMs 160) in the EPGs 162, 164, 166, and 168 can have certain attributes, such as an address, location, identity, prefix, functionality, application service, etc., and can be physical and/or virtual. EPGs are thus logical grouping of such endpoints based on one or more common factors. Non-limiting example factors which can be used to group endpoints into a common EPG include common security requirements, common VM mobility requirements, common QoS (quality-of-service) settings, common L4-L7 (Layer 4 through Layer 7) services, etc. EPGs (e.g., 162, 164, 166, and 168) can span multiple switches and can be associated with respective bridge domains (BDs). In some aspects, endpoint membership in an EPG can be static or dynamic.

EPGs 162, 164, 166, and 168 can contain respective endpoint memberships and can represent different EPGs (e.g., logical groupings) that are based on different, respective factors as previously explained. For example, EPG 162 may represent a logical grouping of endpoints (e.g., VMs 160) configured as web servers (e.g., WEB-EPG), EPG 164 may represent a logical grouping of endpoints (e.g., VMs 160) configured as database servers (e.g., DB-EPG), and EPG 166 may represent a logical grouping of endpoints (e.g., VMs 160) configured as specific application servers (e.g., APP.A-EPG). The controller 155 can configure specific policies (e.g., contracts, filters, requirements, etc.) for each of the EPGs 162, 164, 166, and 168. Such policies or contracts can define, for example, what EPGs can communicate with each other and what type of traffic can pass between the EPGs 162, 164, 166, and 168.

The controller 155 can also configure VRF instances (134A, 134B, 134C, and 134N) which provide different address domains that serve as private networks and segregate traffic between the VRFs. The VRFs 136A-N can include various, respective objects such as endpoints (e.g., VMs 160) EPGs (e.g., 162, 164, 166, and 168), etc. For example, EPG 162 can reside in VRF 134A, EPG 164 can reside in VRF 134B, EPG 166 can reside inside VRF 134C, and EPG 168 can reside in VRF 134N.

The controller 155 may work with the MSC 112 to implement the VRFs 134 and associated policies in the on-premises network 102 as well as the public cloud networks 106 and 110. Such policies can be coordinated by the multi-site controller 112 with the controller 155 in the on-premises network 102 and the cloud controllers 114 in the public cloud networks 106 and 110.

FIG. 1C illustrates a system diagram of an example architecture of a multi-cloud fabric 100 configured to maintain isolation and segregation for network paths through the multi-cloud fabric 100 that utilizes VRF technologies. Insofar as the components and architecture of the public cloud network 110 is similar to that of the public cloud network 106 in FIG. 1A, the functionality is similar for the public cloud network 110. Importantly, the VPCs 184 in the public cloud network 110 are included in the same VRFs 134A-134N as the VPCs 130A-130N of the public cloud network 106, and also the EPGs 164 of the on-premises network 102. In this way, an enterprise or other organization that utilized the resources of the multi-cloud fabric may extend VRFs 134 across multiple networks 102, 106, and 110 to manage groups of endpoints 132 and 186 as well as virtual machines 160 using the same constraints, policies, models, etc.

Figure 2:
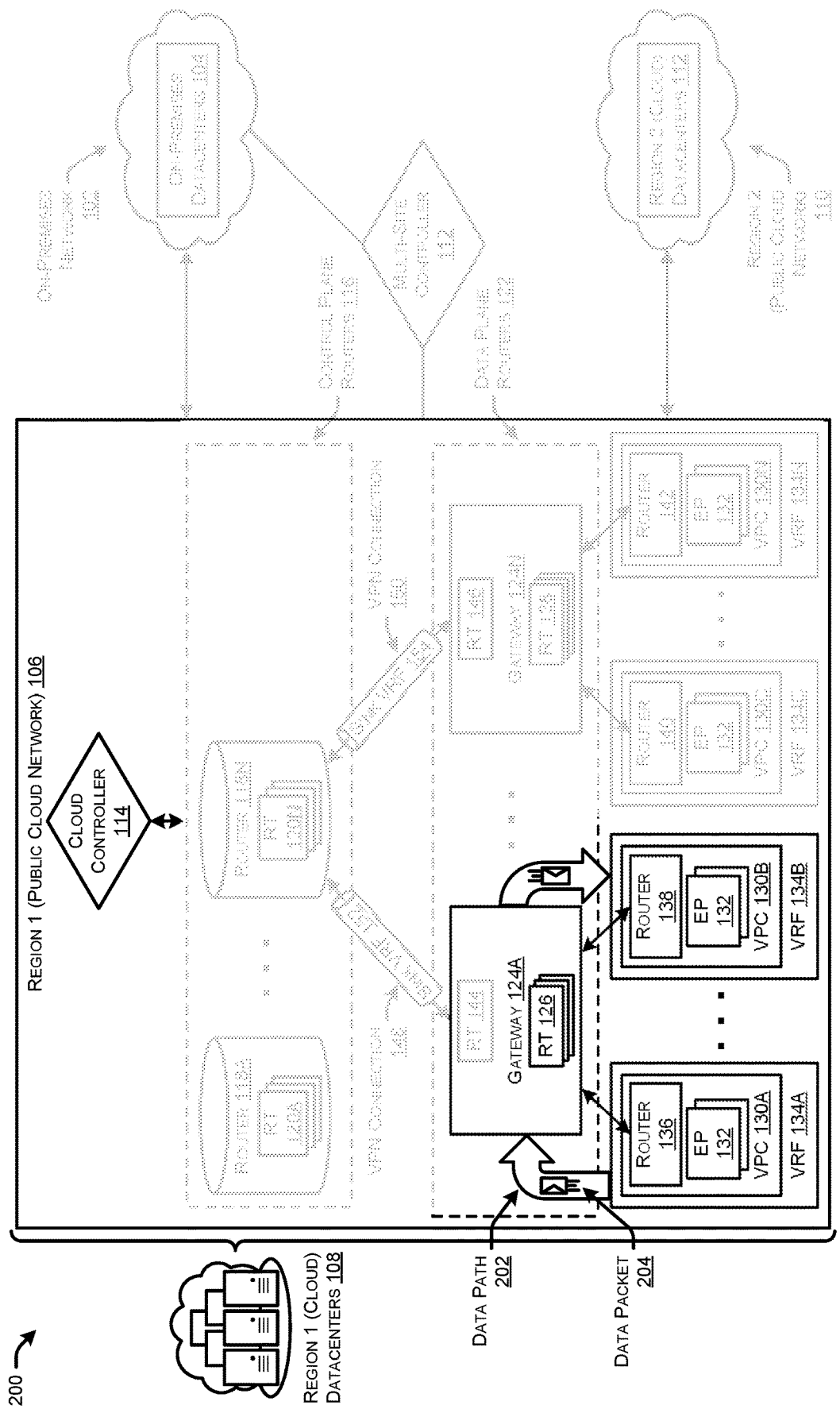
FIG. 2 illustrates an example data flow of a packet that is communicated between two virtual private clouds (VPCs) that are connected to a same gateway in a cloud network of a multi-cloud fabric.

FIG. 2 illustrates an example environment 200 including the multi-cloud fabric 100 through which an example data flow of a packet that is communicated between two virtual private clouds (VPCs) 130 that are connected to a same gateway 124A in a cloud network 106 of a multi-cloud fabric 100. Although illustrates as being in a single region 1 106, the VPCs 130A and 130B may be located across different regions that are managed by a same cloud controller 114. That is, the VPC 130A may be behind gateway 124A and VPC 130B may be behind gateway 124N such that the traffic flows through a router 118 using the sink VRFs 152/154 as described in FIGS. 1A-1C.

The illustrated data path 202 for the data packet 204 comprises an intra-gateway 124A where CPB 130A sends the data packet 204 to the VPC 130B via the gateway 124A. in such an example, the VPCs 130A and 130B may simply use the networking provided by the public cloud network 106 to talk to each other. The routing for the data packet 204 may occur purely within the gateway 124A, and the traffic including the data packet 204 need not exit the gateway 124A, and does not enter the router 118N or transit VPC in which the router 118 is located.

Figure 3:
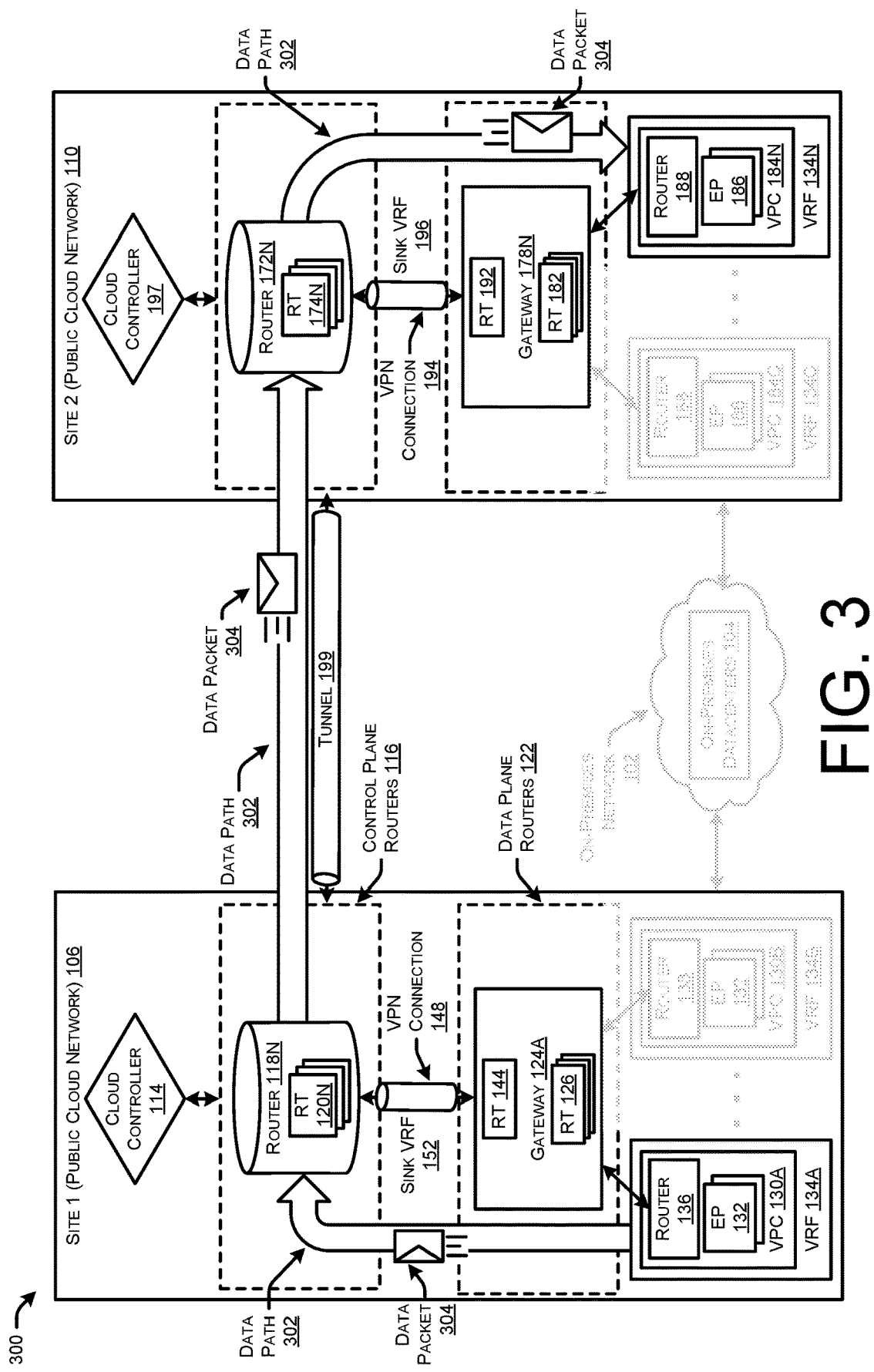
FIG. 3 illustrates an example data flow of a packet that is communicated between two VPCs that are connected to different gateways in a cloud network of a multi-cloud fabric.

FIG. 3 illustrates an example environment 300 including an example data path 302 of a data packet 304 that is communicated between two VPCs 130 and 184 that are connected to different gateways 118 and 178 in different sites (e.g., cloud networks 106 and 110) of a multi-cloud fabric 100. As shown, each site 106 and 110 may have their own cloud controllers 114 and 197, respectively.

The illustrated data path 302 may comprise an inter-gateway data path 302 such that the data packet 304 originates in a VPC 130A behind the gateway 124A, and is sent from the public cloud network 106 (e.g., router 118N) across a tunnel 199 (e.g., IPSec Tunnel+BGP EVPN) to the site 2, public cloud network 110, through the router 172N and another gateway 178N to the VPC 184N. The gateways 124A and 178N may communicate via the VPN tunnels 148 and 194, respectively. The traffic along the data path 302 may comprise layer three traffic (L3) due to the gateways 124 and 178 being unable to support a network overlay, such as VxLAN. Further, the data packet 304 and other traffic may be routed based on VRF leaking between the VRF 134A and 134N in which the VPCs 130A and 184N are located. According to the techniques described above, the gateways 124A and 178N may receive each other's routes (e.g., routes in route tables 126 and 182) via an IPv4/BGP session between the routers 118 and 172.

Figure 4:
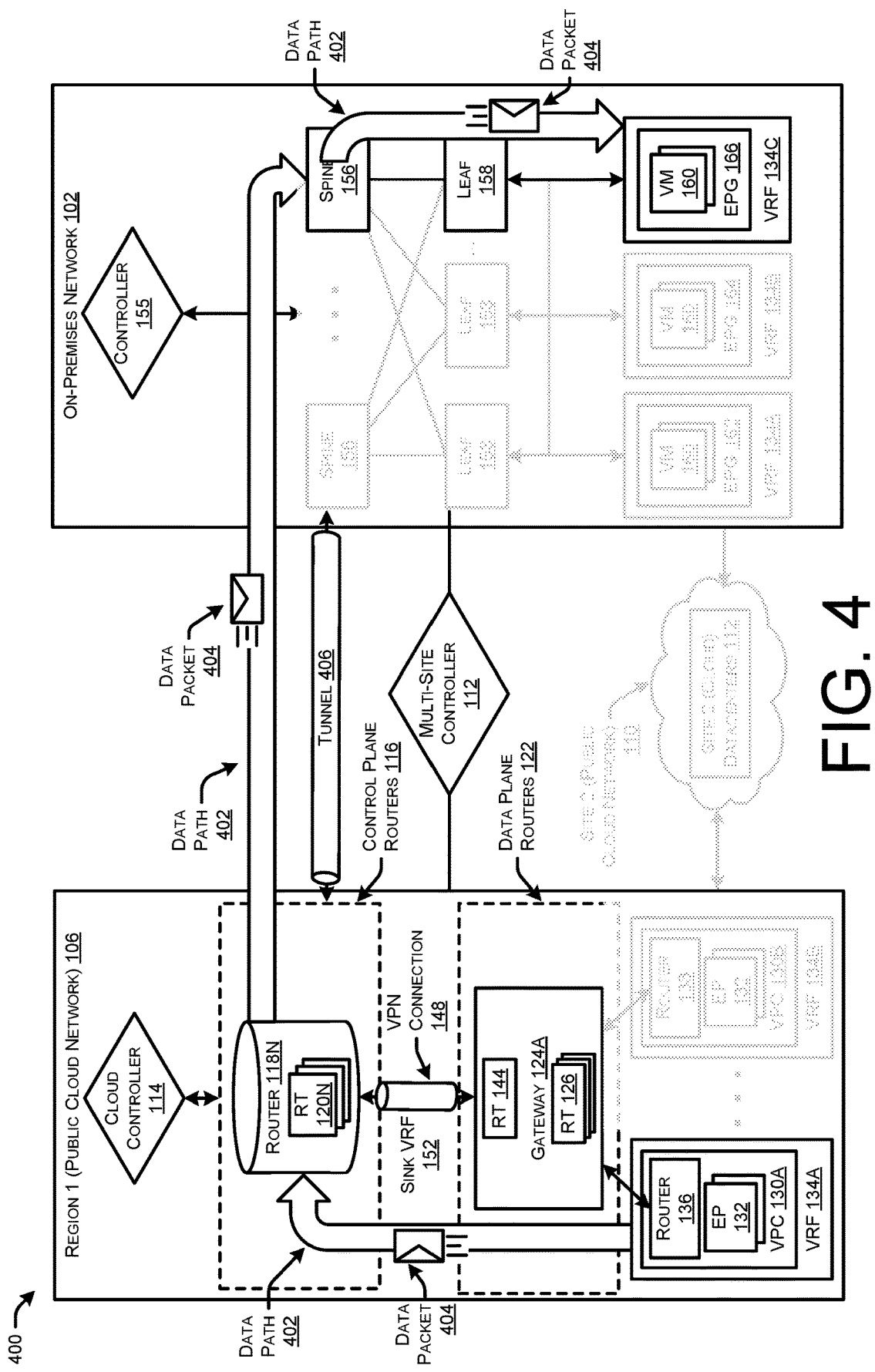
FIG. 4 illustrates an example data flow of a packet that is communicated between a VPC in a cloud network and an endpoint in an on-premises network over an interconnect of a multi-cloud fabric.

FIG. 4 illustrates an example environment 400 illustrating an example data flow through a data path 402 including the flow of a data packet 404 that is communicated between a VPC 130A in a cloud network 106 and a virtual machine 160 in an on-premises network 102 over an interconnect of a multi-cloud fabric 100.

The illustrated data path 402 may comprise an inter-region/site data path 402 such that the data packet 404 originates in a VPC 130A behind the gateway 124A, is sent through the router 118N, across a connection (e.g., tunnel 406), and to the virtual machine 160 in the on-premises network 102. The data packet 404 may be passed through the gateway 124A and to the router 118N as described above to translate VRF information for the data packet 404 across the gateway 124A. The router 118N may determine, using route tables 120N, the source IP address, and the sink VRF 152, a next hop for the data packet 404. The router 118N may then encapsulate the data packet 404 using VxLAN based on the source VRF, and send the encapsulated data packet 404 over the tunnel 406, which may comprise an IPSec tunnel with BGP/EPVN, to the on-premises network 102. The data packet 404 may be received at the spine 156 via the external facing IPSec tunnel 406, and be routed through the on-premises network 102 to the VM 160.

Figure 5:
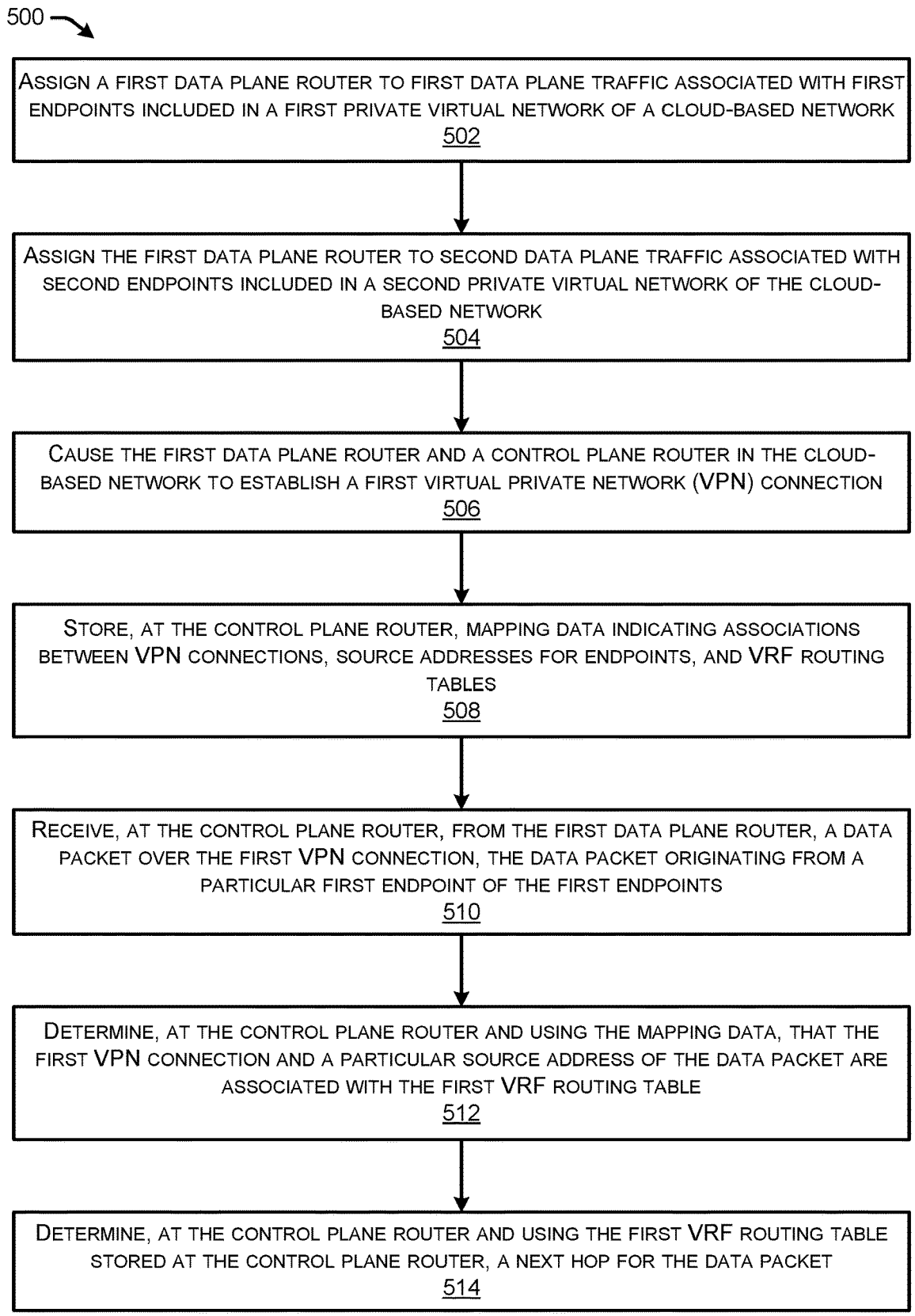
FIG. 5 illustrates a flow diagram of an example method for maintaining isolation and segregation for network paths through multi-cloud fabrics that utilize virtual routing and forwarding (VRF) technologies.

FIG. 5 illustrates a flow diagram of an example method 500 and that illustrate aspects of the functions performed at least partly by one or more devices in the multi-cloud environment 100 as described in FIGS. 1A-1C and 2-4. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for maintaining isolation and segregation for network paths through multi-cloud fabrics 100 that utilize virtual routing and forwarding (VRF) technologies. In some examples, the method 500 may be performed by a system comprising one or more processors and one or more non-transitory computer-readable media storing computer-executable instructions that, when executed by the one or more processors, cause the one or more processors to perform the method 500.

At 502, a controller may assign a first data plane router to first data plane traffic associated with first endpoints included in a first private virtual network of a cloud-based network. The first data plane router may comprise a gateway 124, and the first private virtual network may comprise a VCP 130. In some examples, the first private virtual network is associated with a first address space (e.g., VRF) for the first endpoints 132 that is associated with a first virtual routing and forwarding (VRF) routing table 126 stored in the first data plane router 124. As described above, the cloud-based network 106 may be included in a multi-cloud fabric 100 that further includes an on-premises network 102 of on-premises endpoints (e.g., VMs 160).

At 504, the controller may assign the first data plane router (e.g., gateway 124) to second data plane traffic associated with second endpoints 132 included in a second private virtual network 130B of the cloud-based network 106. In such examples, the second private virtual network 130B is associated with a second address space (e.g., VRF) for the second endpoints 132 that is associated with a second VRF routing table 126 stored in the first data plane router 124A.

At 506, the controller (or another device) may cause the first data plane router and a control plane router 118 in the cloud-based network 106 to establish a first virtual private network (VPN) connection 152. The control plane router 118 may have a second VPN connection 154 with a second data plane router 124 and a third VPN connection 406 with the on-premises network 102.

At 508, the control plane router may store mapping data indicating associations between VPN connections, source addresses for endpoints, and VRF routing tables.

At 510, the control plane router 118N may receive, from the first data plane router 124A, a data packet over the first VPN connection 148. The data packet may have originated from a particular first endpoint 132 of the first endpoints 132.

At 512, the control plane router 118 may determine, using the mapping data, that the first VPN connection and a particular source address of the data packet are associated with the first VRF routing table.

At 514, the control plane router may determine, using the first VRF routing table stored at the control plane router, a next hop for the data packet.

In some examples, the method 500 further comprises determining that a one or more first subnets of the first private virtual network do not overlap with one or more second subnets of the second private virtual network, and wherein the first data plane router is assigned to the first private virtual network and the second private virtual network based at least in part on the one or more first subnets not overlapping with the one or more second subnets.

Further, in some instances the mapping data comprises a sink VRF routing table having entries corresponding to the VPN connections to the control plane router, and the entries of the sink VRF routing table corresponding to the VPN connections are each mapped to respective address spaces associated with respective VRF routing tables for respective endpoints in respective private virtual networks.

In some examples, determining that the first VPN connection and the particular source address of the data packet as associated with the first routing table comprises identifying an entry, from the entries in the sink VRF routing table, corresponding to the first VPN connection, and determining, using the entry in the sink VRF routing table, that the particular source address of the data packet is included in the first address space that is associated with the first routing table.

In some instance, determining the next hop for the data packet comprises determining to send the data packet to the second data plane router, receiving the data packet over the first VPN connection comprises receiving, at the control plane router, the data packet over one or more first Border Gateway Protocol (BGP) sessions between the control plane router and the first data plane router, and the method 500 further comprises sending the data packet to the second data plane router using one or more second BGP sessions between the control plane router and the second data plane router.

In some examples, determining the next hop for the data packet comprises determining to send the data packet to the on-premises network, and the method 500 further comprises encapsulating, by the control plane router, the data packet using a Virtual Extensible LAN (VxLAN) protocol to create a control layer data packet, and sending the control layer data packet to the on-premises network.

Figure 6:
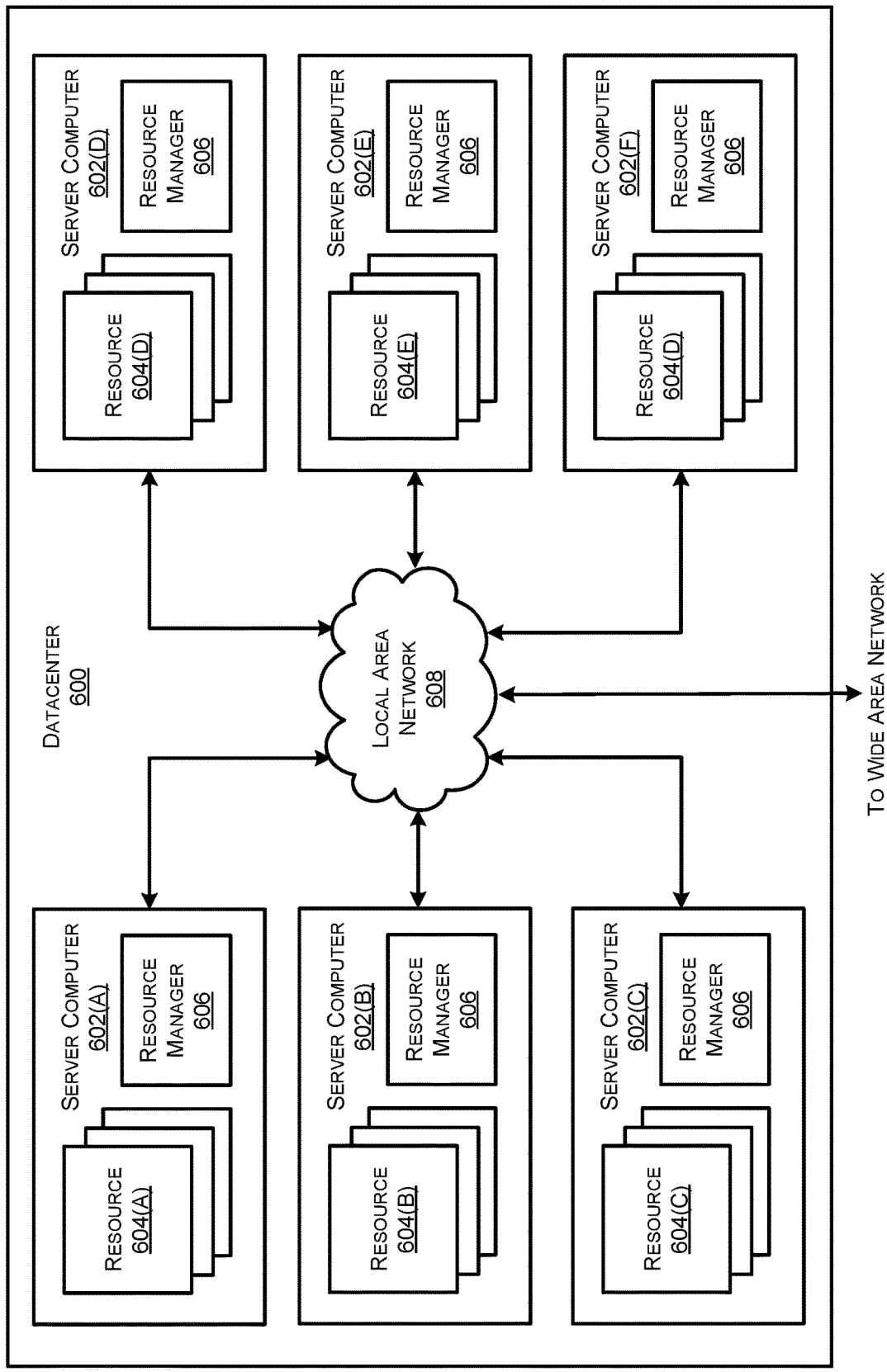
FIG. 6 illustrates a computing system diagram illustrating a configuration for a datacenter that can be utilized to implement aspects of the technologies disclosed herein.

FIG. 6 is a computing system diagram illustrating a configuration for a datacenter 600 that can be utilized to implement aspects of the technologies disclosed herein. The example datacenter 600 shown in FIG. 6 includes several server computers 602A-602E (which might be referred to herein singularly as "a server computer 602" or in the plural as "the server computers 602") for providing computing resources. In some examples, the resources and/or server computers 602 may include, or correspond to, the EPs 132, EPGs 162, and/or EPs 186 described herein. Similarly, the datacenter 600 may correspond to one or more of the on-premises datacenters 104, the cloud data centers 108 (site 1), and/or the cloud data centers 112 (site 2).

The server computers 602 can be standard tower, rackmount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the datacenter 600 can also be configured to provide network services and other types of services.

In the example datacenter 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between datacenters 600, between each of the server computers 602A-602E in each datacenter 600, and, potentially, between computing resources in each of the server computers 602. It should be appreciated that the configuration of the datacenter 600 described with reference to FIG. 6 is merely illustrative and that other implementations can be utilized.

In some examples, the server computers 602 may each execute one or more virtual resources that support a service or application provisioned across a set or cluster of servers 602. The virtual resources on each server computer 602 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by cloud computing networks may be utilized to implement the various services described above. The computing resources provided by the cloud computing networks can include various types of computing resources, such as data processing resources like application containers and VM instances, data storage resources, networking resources, data communication resources, network services, and the like.

Each type of computing resource provided by the cloud computing networks can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing networks can also be configured to provide other types of computing resources not mentioned specifically herein.

The computing resources provided by the cloud computing networks may be enabled in one embodiment by one or more datacenters 600 (which might be referred to herein singularly as "a datacenter 600" or in the plural as "the datacenters 600"). The datacenters 600 are facilities utilized to house and operate computer systems and associated components. The datacenters 600 typically include redundant and backup power, communications, cooling, and security systems. The datacenters 600 can also be located in geographically disparate locations. One illustrative embodiment for a datacenter 600 that can be utilized to implement the technologies disclosed herein will be described below with regard to FIG. 6.

Figure 7:
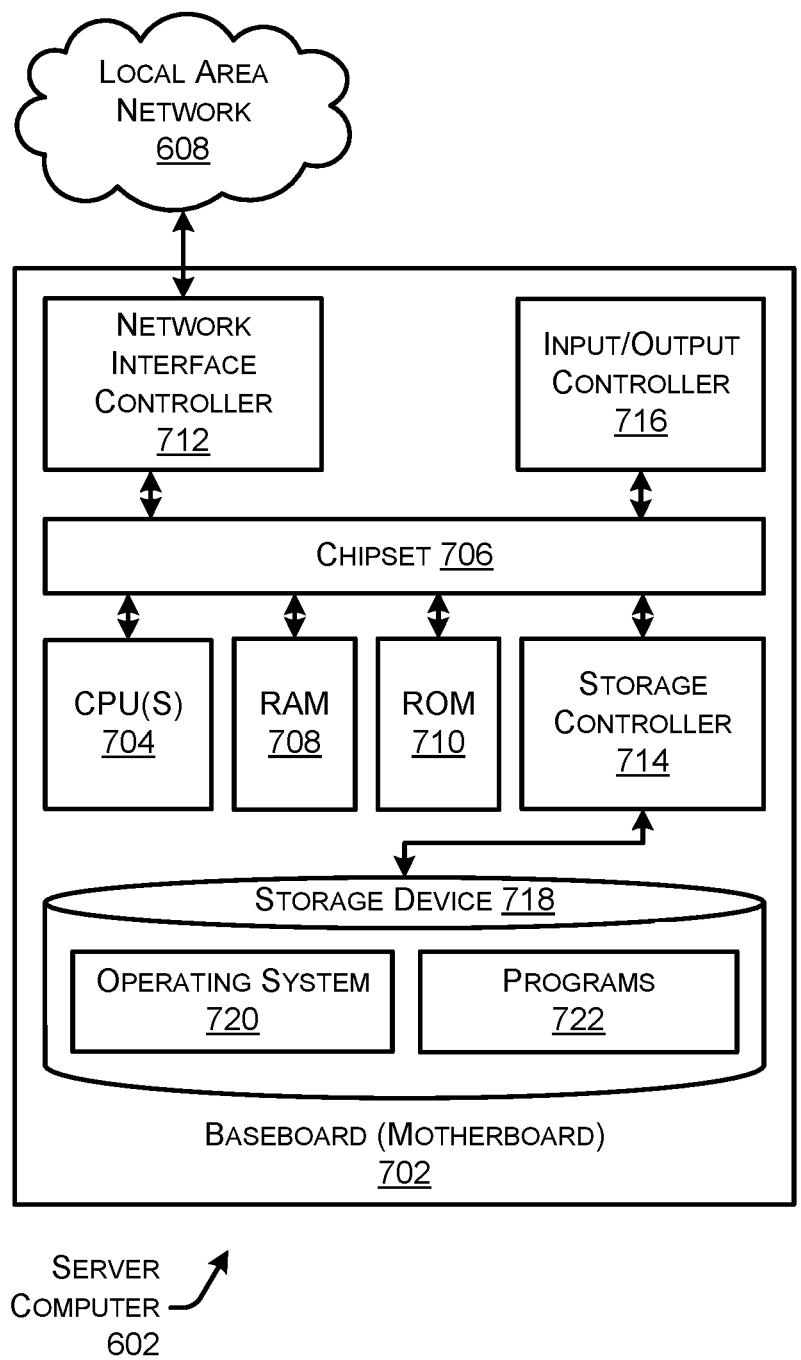
FIG. 7 is a computer architecture diagram showing an illustrative computer hardware architecture for implementing a server device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to a physical devices or resources described herein.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608. It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by the cloud computing network, and or any components included therein, may be supported by one or more devices similar to computer 602. Stated otherwise, some or all of the operations performed by the cloud computing network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-6. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

The server computer 602 may support a virtualization layer, such as one or more virtual resources executing on the server computer 602. In some examples, the virtualization layer may be supported by a hypervisor that provides one or more virtual machines running on the server computer 602 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   assigning a first data plane router to first data plane traffic associated with first endpoints included in a first private virtual network of a cloud-based network, wherein the first private virtual network is associated with a first address space for the first endpoints that is associated with a first virtual routing and forwarding (VRF) routing table stored in the first data plane router, the cloud-based network being included in a multi-cloud fabric that further includes an on-premises network of on-premises endpoints;
   assigning the first data plane router to second data plane traffic associated with second endpoints included in a second private virtual network of the cloud-based network, wherein the second private virtual network is associated with a second address space for the second endpoints that is associated with a second VRF routing table stored in the first data plane router;
   causing the first data plane router and a control plane router in the cloud-based network to establish a first virtual private network (VPN) connection, wherein the control plane router has a second VPN connection with a second data plane router and a third VPN connection with the on-premises network;
   storing, at the control plane router, mapping data indicating associations between VPN connections, source addresses for endpoints, and VRF routing tables;
   receiving, at the control plane router, from the first data plane router, a data packet over the first VPN connection, the data packet originating from a particular first endpoint of the first endpoints;
   determining, at the control plane router and using the mapping data, that the first VPN connection and a particular source address of the data packet are associated with the first VRF routing table; and
   determining, at the control plane router and using the first VRF routing table stored at the control plane router, a next hop for the data packet.

2. The method of claim 1, further comprising:
   determining that a one or more first subnets of the first private virtual network do not overlap with one or more second subnets of the second private virtual network, wherein the first data plane router is assigned to the first private virtual network and the second private virtual network based at least in part on the one or more first subnets not overlapping with the one or more second subnets.

3. The method of claim 1, wherein:
   the mapping data comprises a sink VRF routing table having entries corresponding to the VPN connections to the control plane router; and
   the entries of the sink VRF routing table corresponding to the VPN connections are each mapped to respective address spaces associated with respective VRF routing tables for respective endpoints in respective private virtual networks.

4. The method of claim 3, wherein determining that the first VPN connection and the particular source address of the data packet as associated with the first routing table comprises:
   identifying an entry, from the entries in the sink VRF routing table, corresponding to the first VPN connection; and
   determining, using the entry in the sink VRF routing table, that the particular source address of the data packet is included in the first address space that is associated with the first routing table.

5. The method of claim 1, wherein:
   determining the next hop for the data packet comprises determining to send the data packet to the second data plane router;
   receiving the data packet over the first VPN connection comprises receiving, at the control plane router, the data packet over one or more first Border Gateway Protocol (BGP) sessions between the control plane router and the first data plane router, and
   further comprising sending the data packet to the second data plane router using one or more second BGP sessions between the control plane router and the second data plane router.

6. The method of claim 1, wherein determining the next hop for the data packet comprises determining to send the data packet to the on-premises network, further comprising:
   encapsulating, by the control plane router, the data packet using a Virtual Extensible LAN (VxLAN) protocol to create a control layer data packet; and
   sending the control layer data packet to the on-premises network.

7. The method of claim 1, wherein:
   the first data plane router stores a first instance of the first VRF routing table and a first instance of the second VRF routing table; and
   the control plane router stores a second instance of the first VRF routing table and a second instance of the second VRF routing table.

8. A system comprising:
   one or more processors; and
   one or more non-transitory computer-readable media storing computer-executable instructions that, when executed by the one or more processors, cause the one or more processors to:
   assign a first data plane router to first data plane traffic associated with first endpoints included in a first private virtual network of a cloud-based network, wherein the first private virtual network is associated with a first address space for the first endpoints that is associated with a first virtual routing and forwarding (VRF) routing table stored in the first data plane router, the cloud-based network being included in a multi-cloud fabric that further includes an on-premises network of on-premises endpoints;
   assign the first data plane router to second data plane traffic associated with second endpoints included in a second private virtual network of the cloud-based network, wherein the second private virtual network is associated with a second address space for the second endpoints that is associated with a second VRF routing table stored in the first data plane router;
   cause the first data plane router and a control plane router in the cloud-based network to establish a first virtual private network (VPN) connection, wherein the control plane router has a second VPN connection with a second data plane router and a third VPN
connection with the on-premises network;
store, at the control plane router, mapping data indicating associations between VPN connections, source addresses for endpoints, and VRF routing tables;
receive, at the control plane router, from the first data plane router, a data packet over the first VPN connection, the data packet originating from a particular first endpoint of the first endpoints;
determine, at the control plane router and using the mapping data, that the first VPN connection and a particular source address of the data packet are associated with the first VRF routing table; and
determine, at the control plane router and using the first VRF routing table stored at the control plane router, a next hop for the data packet.

9. The system of claim 8, comprising further computer-executable instructions that, when executed by the one or more processors, cause the one or more processors to:
determine that a one or more first subnets of the first private virtual network do not overlap with one or more second subnets of the second private virtual network, wherein the first data plane router is assigned to the first private virtual network and the second private virtual network based at least in part on the one or more first subnets not overlapping with the one or more second subnets.

10. The system of claim 8, wherein:
the mapping data comprises a sink VRF routing table having entries corresponding to the VPN connections to the control plane router; and
the entries of the sink VRF routing table corresponding to the VPN connections are each mapped to respective address spaces associated with respective VRF routing tables for respective endpoints in respective private virtual networks.

11. The system of claim 10, wherein to determine that the first VPN connection and the particular source address of the data packet as associated with the first routing table comprises:
to identify an entry, from the entries in the sink VRF routing table, corresponding to the first VPN connection; and
to determine, using the entry in the sink VRF routing table, that the particular source address of the data packet is included in the first address space that is associated with the first routing table.

12. The system of claim 8, wherein:
to determine the next hop for the data packet comprises to determine to send the data packet to the second data plane router;
to receive the data packet over the first VPN connection comprises to receive, at the control plane router, the data packet over one or more first Border Gateway Protocol (BGP) sessions between the control plane router and the first data plane router, and
comprising further computer-executable instructions that, when executed by the one or more processors, cause the one or more processors to send the data packet to the second data plane router using one or more second BGP sessions between the control plane router and the second data plane router.

13. The system of claim 8, wherein to determining the next hop for the data packet comprises to determine to send the data packet to the on-premises network, comprising further computer-executable instructions that, when executed by the one or more processors, cause the one or more processors to:
encapsulate, by the control plane router, the data packet using a Virtual Extensible LAN (VxLAN) protocol to create a control layer data packet; and
send the control layer data packet to the on-premises network.

14. The system of claim 8, wherein:
the first data plane router stores a first instance of the first VRF routing table and a first instance of the second VRF routing table; and
the control plane router stores a second instance of the first VRF routing table and a second instance of the second VRF routing table.

15. One or more non-transitory computer-readable media storing computer-executable instructions that, when executed by one or more processors, cause the one or more processors to:
assign a first data plane router to first data plane traffic associated with first endpoints included in a first private virtual network of a cloud-based network, wherein the first private virtual network is associated with a first address space for the first endpoints that is associated with a first virtual routing and forwarding (VRF) routing table stored in the first data plane router, the cloud-based network being included in a multi-cloud fabric that further includes an on-premises network of on-premises endpoints;
assign the first data plane router to second data plane traffic associated with second endpoints included in a second private virtual network of the cloud-based network, wherein the second private virtual network is associated with a second address space for the second endpoints that is associated with a second VRF routing table stored in the first data plane router;
cause the first data plane router and a control plane router in the cloud-based network to establish a first virtual private network (VPN) connection, wherein the control plane router has a second VPN connection with a second data plane router and a third VPN connection with the on-premises network;
store, at the control plane router, mapping data indicating associations between VPN connections, source addresses for endpoints, and VRF routing tables;
receive, at the control plane router, from the first data plane router, a data packet over the first VPN connection, the data packet originating from a particular first endpoint of the first endpoints;
determine, at the control plane router and using the mapping data, that the first VPN connection and a particular source address of the data packet are associated with the first VRF routing table; and
determine, at the control plane router and using the first VRF routing table stored at the control plane router, a next hop for the data packet.

16. The one or more non-transitory computer-readable media of claim 15, comprising further computer-executable instructions that, when executed by the one or more processors, cause the one or more processors to:
determine that a one or more first subnets of the first private virtual network do not overlap with one or more second subnets of the second private virtual network, wherein the first data plane router is assigned to the first private virtual network and the second private virtual network based at least in part on the one or more first subnets not overlapping with the one or more second subnets.

17. The one or more non-transitory computer-readable media of claim 15, wherein:
the mapping data comprises a sink VRF routing table having entries corresponding to the VPN connections to the control plane router; and
the entries of the sink VRF routing table corresponding to the VPN connections are each mapped to respective address spaces associated with respective VRF routing tables for respective endpoints in respective private virtual networks.

18. The one or more non-transitory computer-readable media of claim 17, wherein to determine that the first VPN connection and the particular source address of the data packet as associated with the first routing table comprises:
to identify an entry, from the entries in the sink VRF routing table, corresponding to the first VPN connection; and
to determine, using the entry in the sink VRF routing table, that the particular source address of the data packet is included in the first address space that is associated with the first routing table.

19. The one or more non-transitory computer-readable media of claim 15, wherein:
to determine the next hop for the data packet comprises to determine to send the data packet to the second data plane router;
to receive the data packet over the first VPN connection comprises to receive, at the control plane router, the data packet over one or more first Border Gateway Protocol (BGP) sessions between the control plane router and the first data plane router, and
comprising further computer-executable instructions that, when executed by the one or more processors, cause the one or more processors to send the data packet to the second data plane router using one or more second BGP sessions between the control plane router and the second data plane router.

20. The one or more non-transitory computer-readable media of claim 15, wherein to determining the next hop for the data packet comprises to determine to send the data packet to the on-premises network, comprising further computer-executable instructions that, when executed by the one or more processors, cause the one or more processors to:
encapsulate, by the control plane router, the data packet using a Virtual Extensible LAN (VxLAN) protocol to create a control layer data packet; and
send the control layer data packet to the on-premises network.

* * * * *